US011730075B2

(12) United States Patent
Ferrari et al.

(10) Patent No.: US 11,730,075 B2
(45) Date of Patent: Aug. 22, 2023

(54) SYSTEM AND METHOD FOR MONITORING SOIL FLOW AROUND GROUND-ENGAGING TOOLS OF AN AGRICULTURAL IMPLEMENT BASED ON RADAR DATA

(71) Applicant: CNH Industrial America LLC, New Holland, PA (US)

(72) Inventors: Luca Ferrari, Modena (IT); Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 1022 days.

(21) Appl. No.: 16/453,849

(22) Filed: Jun. 26, 2019

(65) Prior Publication Data

US 2020/0404830 A1 Dec. 31, 2020

(51) Int. Cl.
*A01B 63/111* (2006.01)
*G01S 13/88* (2006.01)
*A01B 49/02* (2006.01)
*A01B 79/00* (2006.01)

(52) U.S. Cl.
CPC ........ *A01B 63/1112* (2013.01); *A01B 49/027* (2013.01); *A01B 79/005* (2013.01); *G01S 13/88* (2013.01)

(58) Field of Classification Search
CPC . A01B 63/1112; A01B 49/027; A01B 79/005; G01S 13/88
See application file for complete search history.

(56) References Cited

U.S. PATENT DOCUMENTS

| 7,019,682 | B1 | 3/2006 | Louberg et al. |
| 8,985,232 | B2 | 3/2015 | Bassett |
| 9,405,039 | B2* | 8/2016 | Anderson ............... A01B 71/08 |
| 9,733,355 | B2 | 8/2017 | Chan et al. |
| 10,123,475 | B2 | 11/2018 | Posselius et al. |
| 2018/0206393 | A1* | 7/2018 | Stoller et al. ......... A01B 79/005 |
| 2018/0310474 | A1 | 11/2018 | Posselius et al. |

(Continued)

FOREIGN PATENT DOCUMENTS

WO    WO2018147929    8/2018

OTHER PUBLICATIONS

Adamchuk, Viacheslav, et al., "Ch. 6. Tools for Proximal Soil Sensing," Natural Resources Conservation Service Soil, https://www.nrcs.usda.gov/wps/portal/nrcs/detail/soils/ref/?cid=nrcs142p2_054256, May 2015, 21 pages.

*Primary Examiner* — Thomas B Will
*Assistant Examiner* — Joel F. Mitchell
(74) *Attorney, Agent, or Firm* — Rebecca Henkel; Rickard Demille

(57) ABSTRACT

In one aspect, a system for monitoring soil flow around a ground-engaging tool of an agricultural implement. The system may include a ground-engaging tool configured to be moved through the soil as the agricultural implement travels across a field. Furthermore, the system may include a radar sensor configured to capture data indicative of a flow of the soil around the ground-engaging tool within a detection zone of the radar sensor. Additionally, the system may include a controller communicatively coupled to the radar sensor. The controller may, in turn, be configured to generate a representation of the flow of the soil around the ground-engaging tool within the detection zone based on data received from the radar sensor.

13 Claims, 4 Drawing Sheets

(56) References Cited

U.S. PATENT DOCUMENTS

| | | |
|---|---|---|
| 2018/0330486 A1 | 11/2018 | Cohen |
| 2018/0352718 A1* | 12/2018 | Kovach et al. ...... A01B 49/027 |
| 2019/0297769 A1* | 10/2019 | Zielke et al. .......... A01B 49/06 |

* cited by examiner

SYSTEM AND METHOD FOR MONITORING SOIL FLOW AROUND GROUND-ENGAGING TOOLS OF AN AGRICULTURAL IMPLEMENT BASED ON RADAR DATA

FIELD OF THE INVENTION

The present disclosure generally relates to agricultural implements and, more particularly, to systems and methods for monitoring soil flow around ground-engaging tools of an of agricultural implement based on captured radar data.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground-engaging tools, such as shanks, harrow disc blades, leveling blades, and/or the like, that are configured to loosen and/or otherwise agitate the soil to prepare the field for subsequent planting operations. In this regard, during a tillage operation, the ground-engaging tool(s) are moved through the soil as the implement travels across the field, thereby causing the soil to flow around the tool(s). Such soil flow may, in turn, be indicative of the performance of the tillage operation. However, it may be difficult for the tillage implement operator to view the soil flow around the tool(s) (e.g., due to dust).

Accordingly, an improved system and method for monitoring soil flow around a ground-engaging tool of an agricultural implement that overcomes one or more of the issues in the prior art would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring soil flow around a ground-engaging tool of an agricultural implement. The system may include a ground-engaging tool configured to be moved through the soil as the agricultural implement travels across a field. Furthermore, the system may include a radar sensor configured to capture data indicative of a flow of the soil around the ground-engaging tool within a detection zone of the radar sensor. Additionally, the system may include a controller communicatively coupled to the radar sensor. The controller may, in turn, be configured to generate a representation of the flow of the soil around the ground-engaging tool within the detection zone based on data received from the radar sensor.

In another aspect, the present subject matter is directed to a method for monitoring soil flow around a ground-engaging tool of an agricultural implement. The method may include receiving, with one or more computing devices, radar data indicative of a flow of soil around the ground-engaging tool as the agricultural implement travels across a field. Furthermore, the method may include generating, with one or more computing devices, a representation of a flow of soil around the ground-engaging tool based on received radar data. Additionally, the method may include monitoring, with the one or more computing devices, the flow of the soil around the ground-engaging tool within the generated representation.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
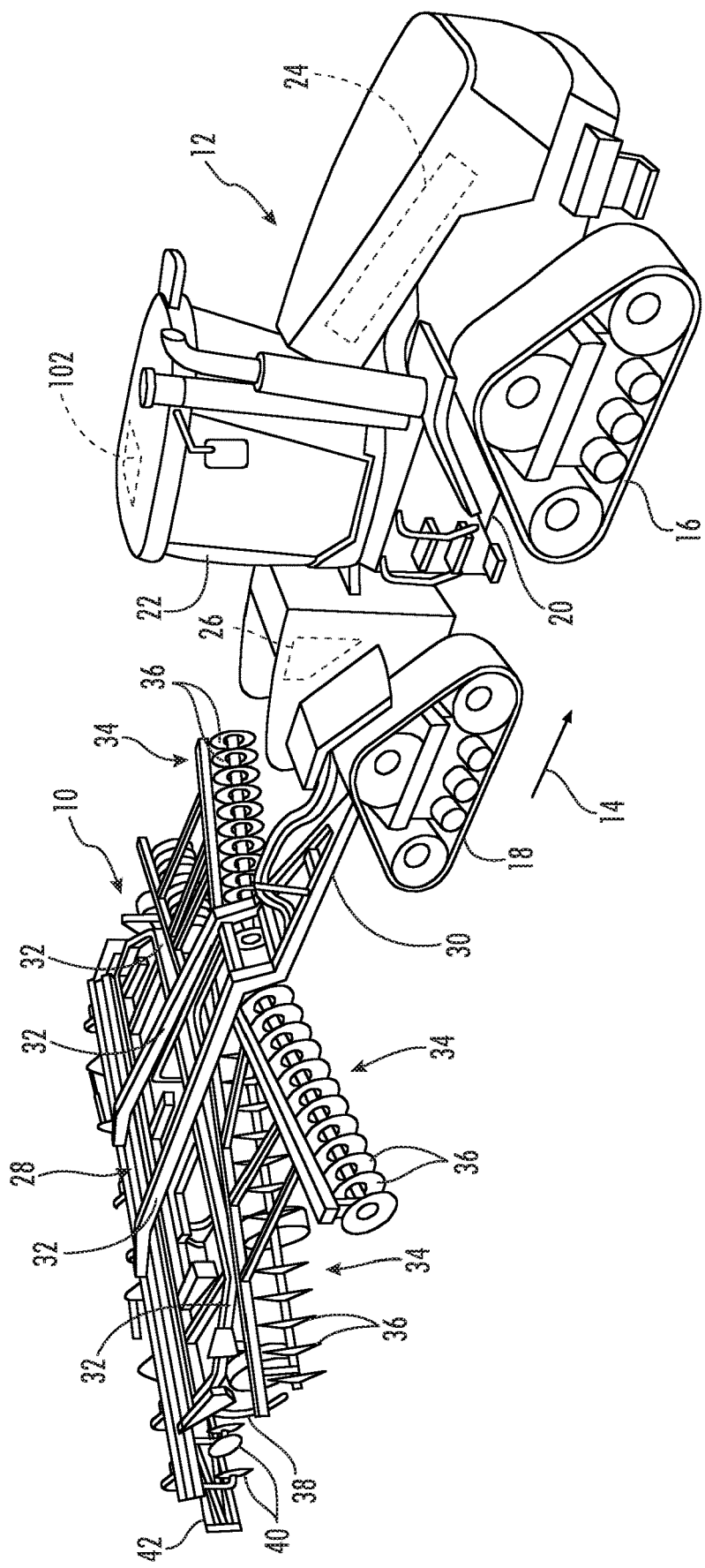
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring soil flow around ground-engaging tools of an agricultural implement. Specifically, in several embodiments, the system may include one or more radar sensors mounted on the implement. Each radar sensor may, in turn, have a detection zone directed at a portion of the field adjacent to one of the ground-engaging tools (e.g., a shank) of the implement. As such, each radar sensor may be configured to capture data indicative of the flow of soil around the ground-engaging tool within its detection zone. Thereafter, a controller of the disclosed system may be configured to generate one or more representations of the flow of soil around the ground-engaging tool(s) based on data received from the radar sensor(s). For example, in one embodiment, the generated representation(s) of the flow of soil around the ground-engaging tool may include a plurality of three-dimensional images of the soil flow(s).

In accordance with aspects of the present subject matter, the controller may be configured to monitor the flow of soil within the generated representation(s). More specifically, the controller may be configured to identify a plurality of soil units (e.g., soil particles, clods, aggregations, and/or the like) within the generated representation(s) and monitor the positions of such soil units as the ground-engaging tool(s) is moved through the soil. For example, the controller may be configured to track or otherwise determine the speeds and/or directions of travel of the soil units. In several embodiments, the controller may be configured to determine the amount(s) of soil accumulated on the ground-engaging tool(s) based on the monitored flow of soil within the generated representation(s). In such embodiments, the controller may be configured to determine that the ground-engaging tool(s) is plugged when the determined soil accumulation exceeds a predetermined accumulation amount. Additionally, in several embodiments, the controller may be configured to determine one or soil characteristics (e.g., soil stickiness) based on the monitored flow of soil within the generated representation(s).

Referring now to the drawings, FIG. 1 illustrates a perspective view of the agricultural implement 10 coupled to a work vehicle 12. In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, as shown in FIG. 1, the implement 10 may generally include a frame 28 configured to be towed by the vehicle 12 via a pull hitch or tow bar 30 in the direction of travel 14. In general, the frame 28 may include a plurality of structural frame members 32, such as beams, bars, and/or the like, configured to support or couple to a plurality of components. As such, the frame 28 may be configured to support a plurality of ground-engaging tools, such as a plurality of shanks, disk blades, leveling blades, basket assemblies, tines, spikes, and/or the like. In one embodiment, the various ground-engaging tools may be configured to perform a tillage operation or any other suitable ground-engaging operation on the field across which the implement 10 is being towed. For example, in the illustrated embodiment, the frame 28 is configured to support various gangs 34 of disc blades 36, a plurality of ground-engaging shanks 38, a plurality of leveling blades 40, and a plurality of crumbler wheels or basket assemblies 42. However, in alternative embodiments, the frame 28 may be configured to support any other suitable ground-engaging tool(s) or combinations of ground-engaging tools.

Moreover, a location sensor 102 may be provided in operative association with the implement 10 and/or the vehicle 12. For instance, as shown in FIG. 1, the location sensor 102 is installed on or within the vehicle 12. However, in other embodiments, the location sensor 102 may be installed on or within the implement 10. In general, the location sensor 102 may be configured to determine the exact location of the implement 10 and/or the vehicle 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a controller(s) of the implement 10 and/or the vehicle 12 (e.g., in the form coordinates) and stored within the controller's memory for subsequent processing and/or analysis. For instance, based on the known dimensional configuration and/or relative positioning between the implement 10 and the vehicle 12, the determined location from the location sensor 102 may be used to geo-locate the implement 10 within the field.

Figure 2:
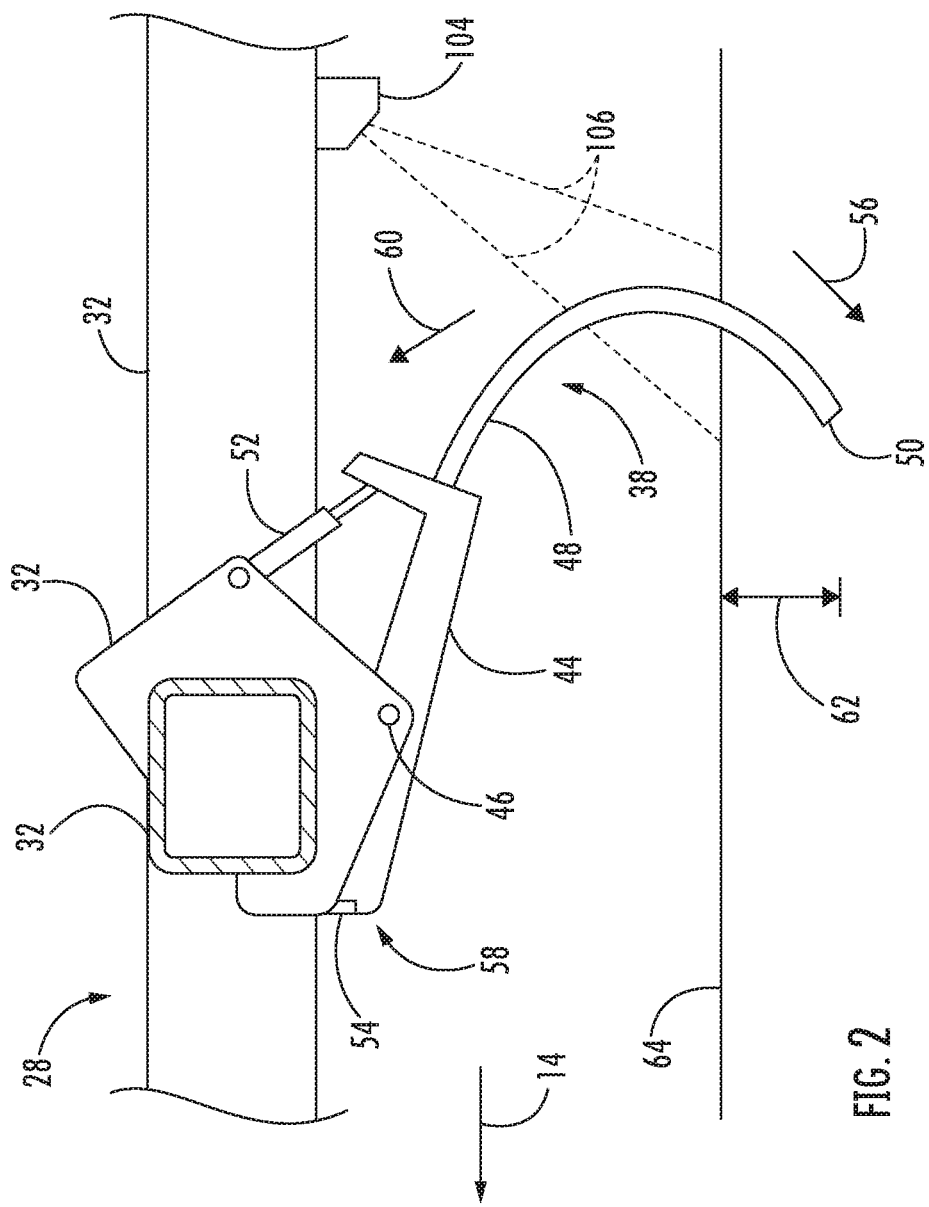
FIG. 2 illustrates a side view of one embodiment of a ground-engaging tool of an agricultural implement in accordance with aspects of the present subject matter.

Referring now to FIG. 2, a side view of one embodiment of a shank 38 is illustrated in accordance with aspects of the present subject matter. As shown, the shank 38 may generally include a base portion 44 pivotally coupled to one of the frame members 32 of the implement frame 28 (e.g., at a pivot joint 46). Furthermore, the shank 38 may include a ground-engaging portion 48 extending from the base portion 44 along a curved or arcuate profile. The ground-engaging portion 48 may include a tip 50 that is configured to penetrate into or otherwise engage the soil as the implement 10 is being pulled through the field. However, in alternative embodiments, the shank 38 may be configured in any other suitable manner.

In several embodiments, an actuator 52 may be coupled between the frame 28 and the shank 38. As such, the actuator 52 may be configured to bias the shank 38 to a predetermined tool position (e.g., a home or base position) relative to the frame 28. In general, the predetermined tool position may correspond to a tool position in which the shank 38 penetrates the soil or ground to a desired depth. In several embodiments, the predetermined ground engaging tool position may be set by a mechanical stop 54. In operation, the actuator 52 may permit relative movement between the shank 38 and the frame 28. For example, the actuator 52 may be configured to bias the shank 38 to pivot relative to the frame 28 in a first pivot direction (e.g., as indicated by arrow 56 in FIG. 2) until an end 58 of the base portion 44 of the shank 38 contacts the stop 54. The actuator 52 may also allow the shank 38 to pivot away from the predetermined tool position (e.g., to a shallower depth of penetration), such as in a second pivot direction (e.g., as indicated by arrow 60 in FIG. 2) opposite the first pivot direction 56, when encountering rocks or other impediments in the field. Additionally, as will be described below, a controller may be configured to control the operation of the actuator 52 to actively adjust a penetration depth (e.g., as indicated by arrow 62 in FIG. 2) of the shank 38 and/or the force applied to the shank 38.

It should be appreciated that the actuator 52 may be configured as any suitable type of actuator configured to bias the shank 38 relative to the frame 28 or otherwise apply a force to the shank 38. For example, in several embodiments, the actuator 52 may be configured as a suitable fluid-driven actuator, such as a suitable hydraulic or pneumatic cylinder. However, in alternative embodiments, the actuator 52 may be configured as any other suitable type of actuator, such as an electric linear actuator. Additionally, in a further embodiment, a spring (not shown) may be configured to bias the shank 38 relative to the frame 28 in lieu of the actuator 52.

In accordance with aspects of the present subject matter, the implement 10 may include one or more radar sensors 104 for use in monitoring the flow of soil around one or more ground-engaging tools of the implement 10. Specifically, in several embodiments, the radar sensor(s) 104 may be coupled to and/or supported on the implement 10 such that each radar sensor 104 has a field of view or detection zone (e.g., as indicated by dashed lines 106 in FIG. 2) directed toward a portion of the field through which one of the ground-engaging tools of the implement 10 is being moved during the performance of an agricultural operation. As such, each radar sensor 104 may be configured to capture data indicative of the flow of soil around the ground-engaging tool present within its detection zone 106.

In general, the radar sensor(s) 104 may be configured to emit radio wave and/or microwave signals directed toward a portion of a field surface 64 within the corresponding detection zone 106. For instance, in several embodiments, the radar sensor(s) 104 may correspond to a multiple-input-multiple-output (MIMO) radar sensor(s). In such embodiments, each radar sensor 104 includes a plurality of transmitting antennas and/or a plurality of receiving antennas. Each transmitting antenna may, in turn, be configured to emit a unique output signal directed at the field surface 64 within its detection zone 106. A portion of each emitted output signal may be reflected by the field surface 64 as a corresponding echo signal. Each receiving antenna may be configured to receive portions of each reflected echo signal. As such, the receiving antennas may receive more echo signals than the transmitting antenna emit, thereby effectively enlarging the aperture(s) of the radar sensor(s) 104. Based on the time of flight, intensity, frequency, and/or phase of each received echo signal, the specific location (e.g., three-dimensional coordinates) of the field surface 64 relative to the corresponding radar sensor 104 may be calculated. Such calculations may generate a point cloud indicative of the flow of soil around the corresponding ground-engaging tool. In addition, Doppler information may be used to monitor the flow of soil. However, in alternative embodiments, the radar sensor(s) 104 may correspond to any other suitable radar device(s), such as polarimetric radar device(s).

It should be appreciated that the radar sensor(s) 104 may be able to capture high-quality data indicative of the flow of soil around the ground-engaging tool(s) in a variety of field conditions. For example, the emitted output signals and reflected echo signals may be able to penetrate dust clouds and other airborne debris typically generated during agricultural operations. Furthermore, the radar sensor(s) 104 may not be reliant on ambient light to detect the flow of soil around the ground-engaging tool(s).

As shown in FIG. 2, in several embodiments, a radar sensor 104 may be provided in operative association with each of the shanks 38. In such embodiments, the radar sensors 104 may be coupled to and/or supported on one of the frame members 32 such that the detection zone 106 of each radar sensor 104 is directed toward a portion of the field through which one of the shanks 38 is being moved during the performance of a tillage operation. As such, each radar sensor 104 may be configured to capture data indicative of the flow of soil around the shank 38 within its detection zone 106. In one embodiment, as shown in FIG. 2, the radar sensors 104 may be positioned aft of the shanks 38 relative to the direction of travel 14 of the implement 10. In such an embodiment, the radar sensors 38 may have forward-facing views of the flow of soil around the shanks 38. However, in alternative embodiments, the radar sensors 104 may be positioned forward of the shanks 38 relative to the direction of travel 14 such that the radar sensors 104 have rear-facing views of the flow of soil around the shanks 38. Moreover, in further embodiments, the radar sensors 104 may be aligned with the shanks 38 relative to the direction of travel 14 (i.e., each radar sensors 104 is next to the corresponding shank 38) such that the radar sensors 104 have side-facing views of the flow of soil around the shanks 38. Furthermore, although FIG. 2 shows a single radar sensor 104 provided in operative association with the illustrated shank 38, it should be appreciated that a plurality of radar sensors 104 may be provided in operative association with each shank 38.

Additionally, it should be appreciated that, in alternative embodiments, the radar sensor(s) 104 may be configured to capture data indicative of the flow of soil around any ground-engaging tool(s) of the implement 10. For example, the radar sensor(s) 104 may be configured to capture data indicative of the flow of soil around one or more of the disc blades 36 and/or the leveling blades 40. Moreover, in embodiments in which the implement 10 is configured as a seed-planting implement (e.g., a seeder, a planter, a sidedresser, and/or the like), the radar sensor(s) 104 may be configured to capture data indicative of the flow of soil around one or more of the disc openers, the gauge wheels, the closing discs/wheels, the residue removal devices, and/or the like.

Figure 3:
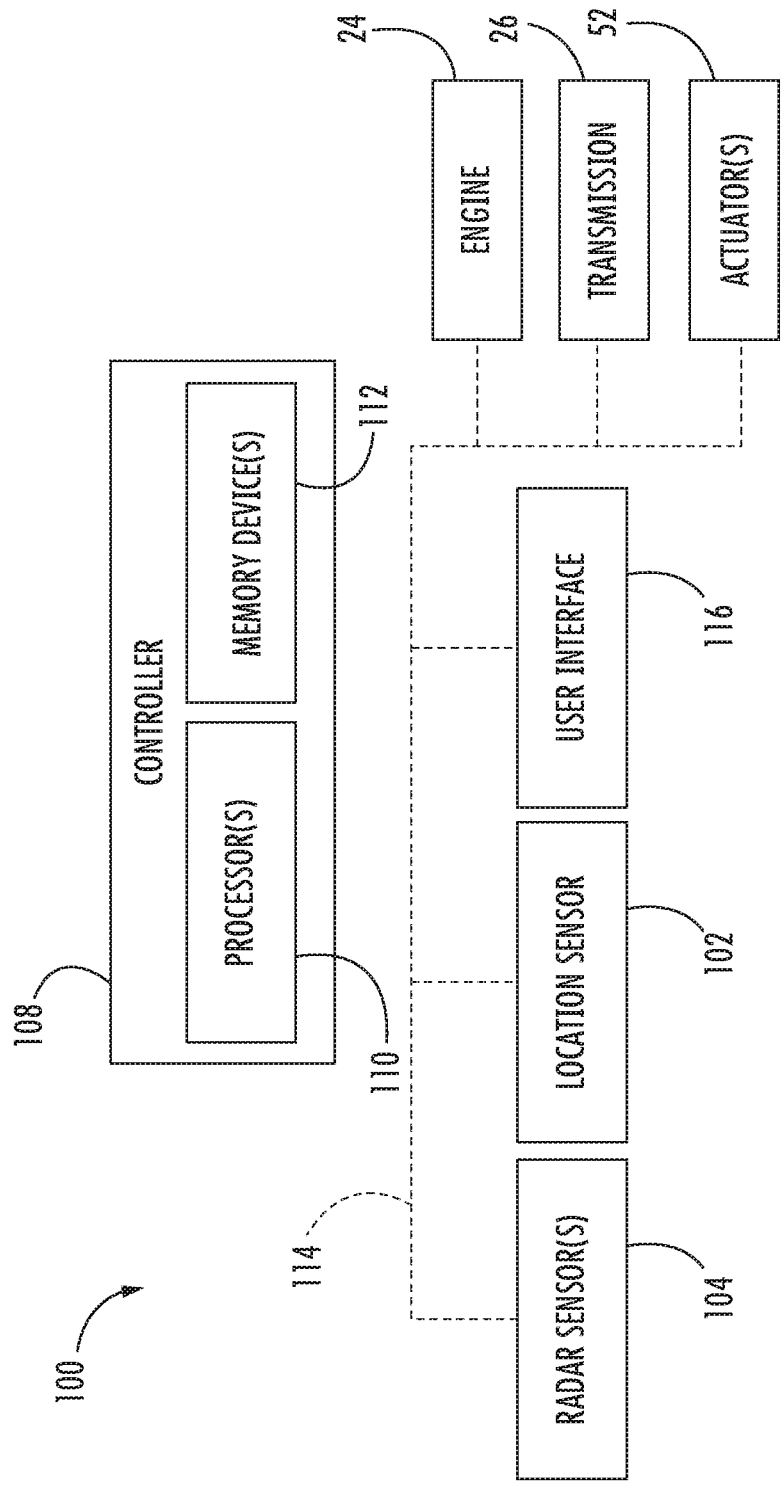
FIG. 3 illustrates a schematic view of one embodiment of a system for monitoring soil flow around ground-engaging tools of an agricultural implement in accordance with aspects of the present subject matter.

Referring now to FIG. 3, a schematic view of one embodiment of a system 100 for monitoring soil flow around ground-engaging tools of an agricultural implement is illustrated in accordance with aspects of the present subject matter. In general, the system 100 will be described herein with reference to the agricultural implement 10 and the work vehicle 12 described above with reference to FIGS. 1 and 2. However, it should be appreciated by those of ordinary skill in the art that the disclosed system 100 may generally be utilized with implements having any other suitable implement configuration and/or vehicles having any other suitable vehicle configuration.

As shown in FIG. 3, the system 100 may include a controller 108 positioned on and/or within or otherwise associated with the implement 10 or the vehicle 12. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 112 may generally be configured to store suitable computer-readable instructions that, when implemented by the processor(s) 110, configure the controller 108 to perform various computer-implemented functions.

In addition, the controller 108 may also include various other suitable components, such as a communications circuit or module, a network interface, one or more input/output channels, a data/control bus and/or the like, to allow controller 108 to be communicatively coupled to any of the various other system components described herein (e.g., the engine 24, the transmission 26, the actuator(s) 52, the location sensor 102, and/or the radar sensor(s) 104). For instance, as shown in FIG. 3, a communicative link or interface 114 (e.g., a data bus) may be provided between the controller 108 and the components 24, 26, 52, 102, 104 to allow the controller 108 to communicate with such components 24, 26, 52, 102, 104 via any suitable communications protocol (e.g., CANBUS).

It should be appreciated that the controller 108 may correspond to an existing controller(s) of the implement 10 and/or the vehicle 12, itself, or the controller 108 may correspond to a separate processing device. For instance, in one embodiment, the controller 108 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 108 may be performed by a single processor-based device or may be distributed across any number of processor-based devices, in which instance such devices may be considered to form part of the controller 108. For instance, the functions of the controller 108 may be distributed across multiple application-specific controllers, such as a navigation controller, an engine controller, an implement controller, and/or the like.

Furthermore, in one embodiment, the system 100 may also include a user interface 116. More specifically, the user interface 116 may be configured to provide feedback (e.g., feedback or input associated with soil flow around the ground-engaging tools of the implement 10) to the operator of the implement/vehicle 10/12. As such, the user interface 116 may include one or more feedback devices (not shown), such as display screens, speakers, warning lights, and/or the like, which are configured to provide feedback from the controller 108 to the operator. The user interface 116 may, in turn, be communicatively coupled to the controller 108 via the communicative link 114 to permit the feedback to be transmitted from the controller 108 to the user interface 116. In addition, some embodiments of the user interface 116 may include one or more input devices (not shown), such as touchscreens, keypads, touchpads, knobs, buttons, sliders, switches, mice, microphones, and/or the like, which are configured to receive user inputs from the operator. In one embodiment, the user interface 116 may be mounted or otherwise positioned within the cab 22 of the vehicle 12. However, in alternative embodiments, the user interface 116 may mounted at any other suitable location.

In several embodiments, the controller 108 may be configured to generate a representation of the flow of soil around one or more ground-engaging tools of an agricultural implement. As described above, the implement 10 may include one or more radar sensors 104, with each radar sensor 104 configured to capture data indicative of the flow of soil around a ground-engaging tool (e.g., one of the disc blades 36, the shanks 38, and/or the leveling blades 40) of the implement 10 that is present within its detection zone 106. In this regard, as the implement 10 is moved across the field, the controller 108 may be configured to receive the data from the radar sensor(s) 104 (e.g., via the communicative link 114). Thereafter, the controller 108 may be configured to analyze/process the received radar data to generate a representation of the flow of soil around each ground-engaging tool. As such, the controller 108 may include a suitable algorithm(s) stored within its memory 112 that, when executed by the processor 110, generates the representation(s) of the flow of soil around the ground-engaging tool(s) of the implement 10 based on the data received from the radar sensor(s) 104.

It should be appreciated that the generated representation(s) of the flow of soil around the ground-engaging tool(s) may correspond to any suitable data structure(s) that correlates the received radar data to the flow of soil around the tool(s). For example, in several embodiments, the generated representation(s) may correspond to a plurality of three-dimensional images, with each image having a three-dimensional arrangement of captured data points. More specifically, as described above, the radar sensor(s) 104 may be configured to capture a plurality of data points, with each data point being indicative of the location of the field surface within the detection zone 106 of the corresponding sensor 104. In such embodiments, the controller 108 may be configured to position each captured data point within a three-dimensional space corresponding to the detection zone(s) of the radar sensor(s) 104 to generate the three-dimensional image(s). As such, groups of data points within the generated image(s) may illustrate the locations and/or profiles of the soil units (e.g., soil particles, soil clods, soil aggregations, and/or the like) flowing around the ground-engaging tools(s) and currently present within the detection zone(s) 106 of the radar sensor(s) 104. However, in alternative embodiments, the initial three-dimensional representation of the field may correspond to any other suitable type of data structure, such as data table.

In accordance with aspects of the present subject matter, the controller 108 may be configured to monitor the flow of the soil around the ground-engaging tool(s) within the generated representation(s). In general, when the implement 10 is performing an agricultural operation on the field, soil may flow around the ground-engaging tool(s) of the agricultural implement 10. During normal operation of the ground-engaging tool(s) (e.g., when the performance of the tool(s) has not been affected by soil/residue accumulated thereon), the soil may flow around the ground-engaging tool(s) in a particular manner, such as with a particular range of flow directions and/or flow speeds). However, when the performance of the ground-engaging tool(s) has been impacted (e.g., due to accumulated soil/residue thereon), the flow of soil around the tool(s) may differ from the flow of soil around the tool(s) during normal operation. As such, the controller 108 may be configured to analyze the generated representation(s) to monitor the flow of soil around the ground-engaging tool(s) within the generated representation(s). As will be described below, in some embodiments, the controller 108 may be configured to control the operation of the implement 10 based on the monitored flow of soil around the ground-engaging tool(s).

In several embodiments, the controller 108 may be configured to monitor the flow of soil around the ground-engaging tool(s) based on the positions of soil units within the generated representation(s). Specifically, in such embodiments, the controller 108 may be configured to identify a plurality of soil units within each generated representation. For example, in one embodiment, the controller 108 may include a suitable algorithm(s) (e.g., an edge-detection algorithm, such as a Canny edge detector) stored within its memory 112 that, when executed by the processor 110, allows the controller 108 to identify a plurality of soil units within the generated representation(s). Thereafter, the controller 108 may be configured to track the positions of each identified soil particle relative to the corresponding ground-engaging tool as the soil units move across the generated representation(s). For instance, in one embodiment, the controller 108 may be configured to determine the speeds and/or the direction of travels of the identified soil units within the generated representation(s). The speeds and/or direction of travels of the soil units may, in turn, be indicative of the performance of the ground-engaging tool(s). However, in alternative embodiments, the controller 108 may be configured to monitor the flow of soil around the ground-engaging tool(s) within the generated representation(s) in any other suitable manner.

It should be appreciated that, as used herein, "soil units" may refer to any unit soil that may flow around the ground-engaging tool(s) of the implement 10. As such, each soil unit may be an individual soil particle or a combination/aggregation of soil particles (e.g., a soil clod).

Additionally, the controller 108 may be configured to determine the accumulation(s) of soil on the ground-engaging tool(s) based on the monitored flow of soil within the generated representation(s). In one embodiment, the controller 108 may be configured to determine the accumulation(s) of soil based on the determined speeds of the soil units relative to the ground-engaging tool(s). More specifically, soil units that have accumulated on the ground-engaging tool(s) may remain stationary relative to such tool(s) or, in certain instances, move relative to the tool(s) at a reduced speed compared to the non-accumulated soil units. As such, the controller 108 may be configured to compare the speeds of the soil units to a predetermined minimum particle speed threshold. Thereafter, the controller 108 may be configured to determine the amount of soil that has accumulated on the ground-engaging tool(s) based on the number of the soil units moving at speeds below the predetermined minimum particle speed threshold.

In another embodiment, the controller 108 may be configured to determine the accumulation(s) of soil based on the determined directions of travel of the soil units relative to the ground engaging tool(s). More specifically, the directions of travel of the soil units flowing around the ground-engaging tool(s) may define a particular angle relative to the direction of travel 14 of the implement 10. However, when soil has accumulated on the ground-engaging tool(s), the soil units must flow around both the tool(s) and the soil accumulated thereon. In such instances, the directions of travel of the soil units flowing around ground-engaging tool(s) and accumulated soil may define different angles relative to the direction of travel 14 of the implement 10. In this regard, the direction of travel of the soil units may be indicative of the amount of soil accumulated on the ground-engaging tool(s). Furthermore, the angle and/or positioning of the ground-engaging tool(s) and the sensor(s) 104 may further be indicative of the amount of the direction of travel of the soil units. For example, the position of the ground-engaging tool(s) may be adjusted such that the direction of travel of the soil units may around the tool(s) changes. Moreover, the position of the sensor(s) 104 may change relative to the ground-engaging tool(s) such that the direction of travel of the soil units appears to change. As such, the controller 108 may be configured to determine the amount of soil accumulated on the ground-engaging tool(s) based on the angles defined between the directions of travel of the soil units and the direction of travel 14 of the implement 10 and/or the angle and/or positioning of the ground-engaging tool(s) and/or the sensor(s) 104. For instance, the controller 108 may include a look-up table(s), suitable mathematical formula, and/or algorithms stored within its memory device(s) 112 that correlates the determined directions of travel of the soil units and/or the relative angle and/or positioning the ground-engaging tool(s) and/or the sensor(s) 104 to the amount of soil accumulated on the ground-engaging tool(s).

In one embodiment, the controller 108 may be configured to provide a notification to an operator of the implement 10 associated with the determined accumulation(s) of the soil of the ground-engaging tool(s) of the implement 10. Specifically, the controller 108 may be configured to transmit instructions to the user interface 116 (e.g., the communicative link 114) instructing the user interface 116 to provide a notification to the operator of the implement/vehicle 10/12 (e.g., by causing a visual or audible notification or indicator to be presented to the operator) indicating the amount(s) of soil that has accumulated on the ground-engaging tool(s). Thereafter, the operator may then choose to adjust one or more operating parameters of the implement 10 and/or the vehicle 12 based on such notifications.

Furthermore, the controller 108 may be configured to determine that the ground-engaging tool(s) is plugged when the determined soil accumulation(s) exceeds a predetermined accumulation amount. In general, a ground-engaging tool may be plugged when enough soil and/or residue has accumulated thereon such that the performance of the tool has been degraded or otherwise impacted. For example, when a ground-engaging disc (e.g., one of the disc blades 36 or the leveling blades 40) is plugged, the rotation of the disc relative to the soil may slow or halt, thereby impacting the performance of the agricultural operation being performed by the disc. As such, the controller 108 may be configured to compare the determined soil accumulation(s) on the ground-engaging tool(s) to a predetermined maximum accumulation threshold associated with plugging of the tool(s). Thereafter, when the determined soil accumulation on a ground-engaging tool exceeds the predetermined maximum accumulation threshold, the controller 108 may be configured to determine that such tool is plugged.

Moreover, the controller 108 may be configured to initiate one or more control actions when it is determined that the ground-engaging tool(s) of the implement 10 is plugged. In general, such control action(s) may be associated with or otherwise intended to prevent further accumulation of soil on the tool(s) and/or de-plug or otherwise remove soil already accumulated on the tool(s). Specifically, in several embodiments, the controller 108 may be configured to automatically adjust one or more operating parameters of the implement 10 and/or the vehicle 12 when it is determined that one or more ground-engaging tools of the implement 10 are plugged. Specifically, in one embodiment, the controller 108 may be configured to initiate adjustment of the force applied to and/or the penetration depth(s) of one or more ground-engaging tools (e.g., the disc blades 36, the shanks 38, and/or the leveling blades 40) of the implement 10. For example, the controller 108 may be configured transmit instructions to the actuator(s) 52 (e.g., via the communicative link 114) instructing the actuator(s) 52 to adjust the force applied to and/or the penetration depth(s) of associated ground engaging tool(s).

Furthermore, in one embodiment, the controller 108 may be configured to automatically adjust the ground speed at which the implement/vehicle 10/12 is traveling across the field when it is determined one or more ground-engaging tools of the implement 10 are plugged. Specifically, the controller 108 may be configured to transmit instructions to the engine 24 and/or the transmission 26 (e.g., via the communicative link 114) instructing the engine 24 and/or the transmission 26 to adjust their operation. For example, the controller 108 may instruct the engine 24 to vary its power output and/or the transmission 26 to upshift or downshift to increase or decrease the ground speed of the implement/vehicle 10/12 in a manner that reduces or minimizes further accumulation of soil on the ground-engaging tool(s). However, in alternative embodiments, the controller 108 may be configured to transmit instructions to any other suitable components (e.g., braking actuators) of the vehicle 12 and/or the implement 10 such that the ground speed of the implement/vehicle 10/12 is adjusted. Furthermore, it should be appreciated that any other suitable parameter(s) the implement 10 and/or the vehicle 12 may be adjusted when it is determined one or more ground-engaging tools of the implement 10 are plugged.

Additionally, the controller 108 may be configured to determine one or more soil characteristics of the portion(s) of the field shown within the generated representation(s). In general, the flow of soil around the ground-engaging tool(s) of the implement 10 may be indicative of various soil characteristic(s) of the field across which the implement 10 is being moved. As such, the controller 108 may be configured to analyze the generated representation(s) of the flow of soil around the ground-engaging tool(s) to determine the one or more soil characteristic of the field.

In several embodiments, the controller 108 may be configured to determine the stickiness of the soil flowing around the ground-engaging tool(s) of the implement 10. In general, the soil stickiness may refer to the capacity of soil to adhere to other objects, such as the ground-engaging tool(s) of the implement 10. Specifically, the texture of the soil flowing around the ground-engaging tool(s) may be indicative of the stickiness soil within the field. As such, the controller 108 may be configured to analyze the texture of the soil flowing around the ground-engaging tool(s) within the generated representation(s). For example, in one embodiment, the controller 108 may include a suitable algorithm(s) (e.g., a texture segmentation algorithm, such as a Gabor filter) stored within its memory 112 that, when executed by the processor 110, allows the controller 108 to determine the soil texture within the generated representation(s). Thereafter, the controller 108 may be configured to determine the stickiness of the soil within the field based on the determined texture(s) of the soil flowing around the ground-engaging tool(s) within the generated representation(s). For instance, the controller 108 may include a look-up table(s), suitable mathematical formula, and/or algorithms stored within its memory device(s) 112 that correlates the determined texture(s) of the soil to the stickiness of the soil. However, in alternative embodiments, the controller 108 may be configured to determine any other suitable soil characteristic(s) of the field based on the monitored flow of soil shown within the generated representation(s).

Furthermore, in several embodiments, the controller 108 may be configured to generate a field map based on the determined soil characteristic values. More specifically, as the implement 10 is moved across the field, the controller 108 may be configured to receive location data (e.g., coordinates) from the location sensor 102 (e.g., via the communicative link 114). Based on the known dimensional configuration and/or relative positioning between the ground-engaging tool(s) associated with the radar sensor(s) 104 and the location sensor 102, the controller 108 may be configured to geo-locate each soil characteristic value within the field. For example, in one embodiment, the coordinates derived from the location sensor 102 and the determined soil characteristic values may each be time-stamped. In such an embodiment, the time-stamped data may allow the soil characteristic values to be matched or correlated to a corresponding set of location coordinates received or derived from the location sensor 102. Thereafter, the controller 108 may be configured to generate a field map (e.g., a graphical field map) illustrating soil characteristic(s) at various positions within the field. For instance, the controller 108 may be configured to execute one or more algorithms stored within its memory 112 that generate the field map based on the determined soil characteristic values and the data received from the location sensor 102. In one embodiment, the controller 108 may be configured to transmit instructions to the user interface 116 (e.g., the communicative link 114) instructing the user interface 116 to display the field map (e.g., a graphical field map).

Figure 4:
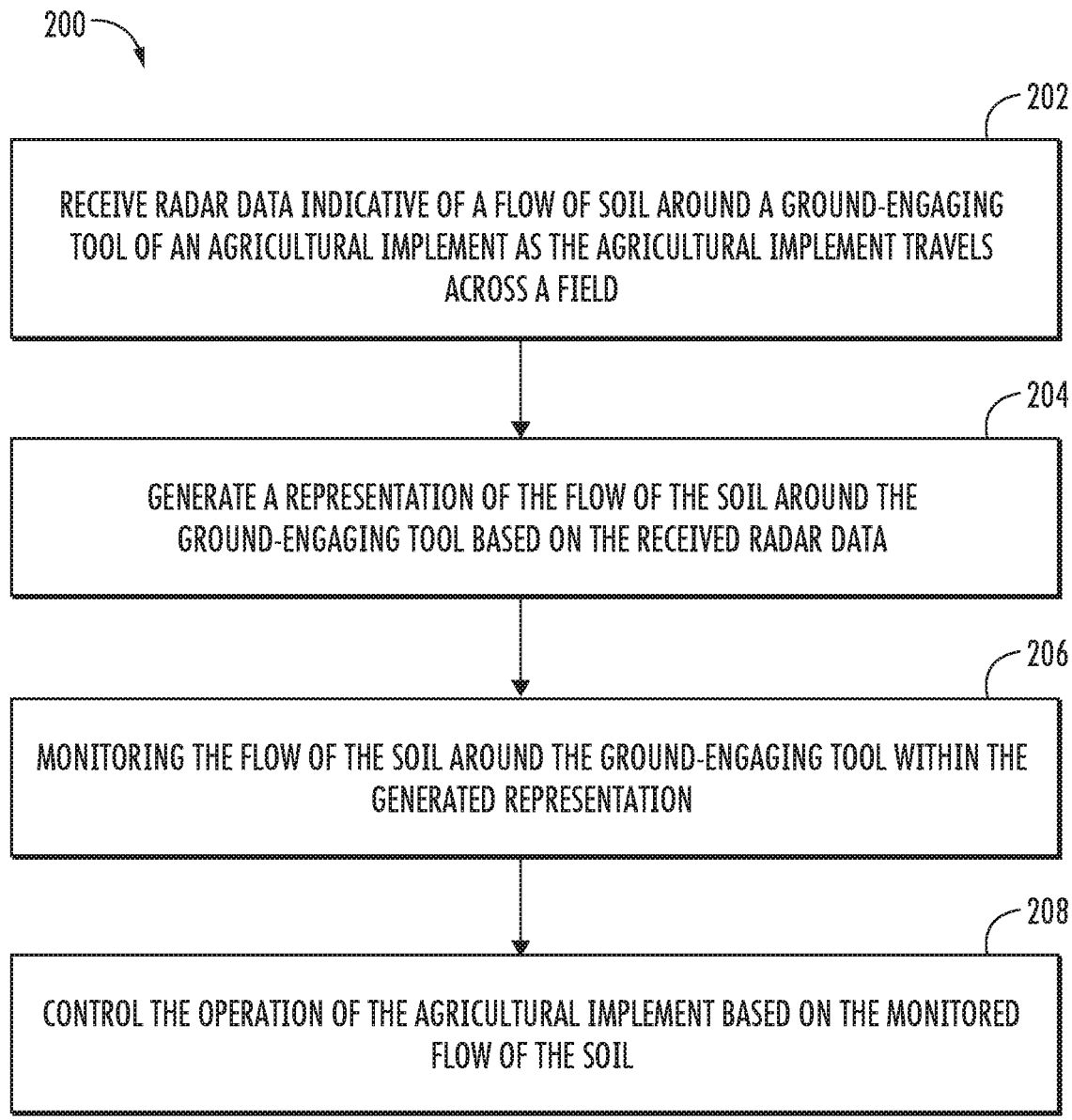
FIG. 4 illustrates a flow diagram of one embodiment of a method for monitoring soil flow around ground-engaging tools of an agricultural implement in accordance with aspects of the present subject matter.

Referring now to FIG. 4, a flow diagram of one embodiment of a method 200 for monitoring soil flow around ground-engaging tools of an agricultural implement is illustrated in accordance with aspects of the present subject matter. In general, the method 200 will be described herein with reference to the agricultural implement 10, the work vehicle 12, and the system 100 described above with reference to FIGS. 1-4. However, it should be appreciated by those of ordinary skill in the art that the disclosed method 200 may generally be implemented with any implement having any suitable implement configuration, any vehicle having any suitable vehicle configuration, and/or any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving, with one or more computing devices, radar data indicative of a flow of soil around a ground-engaging tool of an agricultural implement as the agricultural implement travels across a field. For instance, as described above, the controller 108 may be configured to receive radar data from a radar sensor 104 indicative of the flow of soil around a ground-engaging tool (e.g., one of the discs 36, the shanks 38, or the leveling discs 40) of the agricultural implement 10 as the implement 10 travels across a field.

Additionally, at (204), the method 200 may generating, with one or more computing devices, a representation of a flow of soil around the ground-engaging tool based on received radar data. For instance, as described above, the controller 108 may be configured to generate a representation of the flow of soil around the ground-engaging tool of the implement 10 based on the received radar data.

Moreover, as shown in FIG. 4, at (206), the method 200 may include monitoring, with the one or more computing devices, the flow of the soil around the ground-engaging tool within the generated representation. For instance, as described above, the controller 108 may be configured to monitor the flow of the soil around the ground-engaging tool within the generated representation.

Furthermore, at (208), the method may include controlling, with the one or more computing device, the operation of the agricultural implement based on the monitored flow of the soil. For instance, as described above, the controller 108 may be configured to control the operation of one or more components of the agricultural implement 10 and/or associated work vehicle 12 based on the monitored flow of the soil. Such components may include the engine 24 of the vehicle 12, the transmission 26 of the vehicle 12, and/or the actuator(s) of the implement 10.

It is to be understood that the steps of the method 200 are performed by the controller 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 108 described herein, such as the method 200, is implemented in software code or instructions which are tangibly stored on a tangible computer readable medium. The controller 108 loads the software code or instructions via a direct interface with the computer readable medium or via a wired and/or wireless network. Upon loading and executing such software code or instructions by the controller 108, the controller 108 may perform any of the functionality of the controller 108 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring soil flow around a ground-engaging tool of an agricultural implement, the system comprising:
   a ground-engaging tool configured to be moved through the soil as the agricultural implement travels across a field;
   a radar sensor configured to capture data indicative of a flow of the soil around the ground-engaging tool within a detection zone of the radar sensor; and
   a controller communicatively coupled to the radar sensor, wherein the controller:
      generates a representation of the flow of the soil around the ground-engaging tool within the detection zone based on data received from the radar sensor;
      identifies a plurality of soil units of the soil within the representation; and
      monitors positions of the plurality of soil units within the representation as the ground-engaging tool is moved through the soil;
      determines directions of travel of the plurality of soil units within the representation;
      determines angles defined between the directions of travel of the soil units and a direction of travel of the agricultural implement; and
      determines an accumulation of the soil on the ground-engaging tool based on the determined angles.

2. The system of claim 1, wherein the controller is configured to control the operation of the agricultural implement based on the determined accumulation.

3. The system of claim 1, wherein the controller is configured to provide a notification to an operator of the agricultural implement associated with the determined accumulation of the soil.

4. The system of claim 1, wherein the controller is configured to determine that the ground-engaging tool is plugged when the determined soil accumulation exceeds a predetermined accumulation amount.

5. The system of claim 4, wherein the controller is configured to initiate a control action associated with de-plugging the ground-engaging tool when it is determined that the ground-engaging tool is plugged.

6. The system of claim 1, wherein, when generating the representation, the controller generates a plurality of three-dimensional images of the detection zone based the data received from the radar sensor.

7. The system of claim 1, wherein the controller determines the accumulation of the soil on the ground-engaging tool based on the determined angles and at least one of an angle or a positioning of the ground-engaging tool.

8. The system of claim 1, wherein the controller determines the accumulation of the soil on the ground-engaging tool based on the determined angles and a position of the radar sensor.

9. A method for monitoring soil flow around a ground-engaging tool of an agricultural implement, the method comprising:
   receiving, with one or more computing devices, radar data indicative of a flow of soil around the ground-engaging tool as the agricultural implement travels across a field;
   generating, with one or more computing devices, a representation of the flow of the soil around the ground-engaging tool based on the received radar data;
   identifying, with the one or more computing devices, a plurality of soil units of the soil within the representation;
   monitoring, with the one or more computing devices, positions of the plurality of soil units within the representation as the ground-engaging tool is moved through the soil;
   determining, with the one or more computing devices, a direction of travel of the plurality of soil units within the representation;
   determining, with the one or more computing devices, angles defined between the directions of travel of the soil units and a direction of travel of the agricultural implement; and determining, with the one or more computing devices, an accumulation of the soil on the ground-engaging tool based on the determined angles.

10. The method of claim 9, further comprising:
controlling, with the one or more computing devices, an operation of the agricultural implement based on the determined accumulation.

11. The method of claim 9, further comprising:
determining, with the one or more computing devices, that the ground-engaging tool is plugged when the determined soil accumulation exceeds a predetermined accumulation amount.

12. The method of claim 9, wherein determining the accumulation of soil on the ground-engaging tool comprises determining, with the one or more computing devices, the accumulation of the soil on the ground-engaging tool based on the determined angles and at least one of an angle or a positioning of the ground-engaging tool.

13. The method of claim 9, wherein determining the accumulation of soil on the ground-engaging tool comprises determining, with the one or more computing devices, the accumulation of the soil on the ground-engaging tool based on the determined angles and a position of the radar sensor.

\* \* \* \* \*